July 16, 1968  L. H. TART  3,393,009
CONTROLLED SWINGING SEAT ARRANGEMENT FOR ROW CROP CONVEYOR
Filed March 9, 1967  2 Sheets-Sheet 1
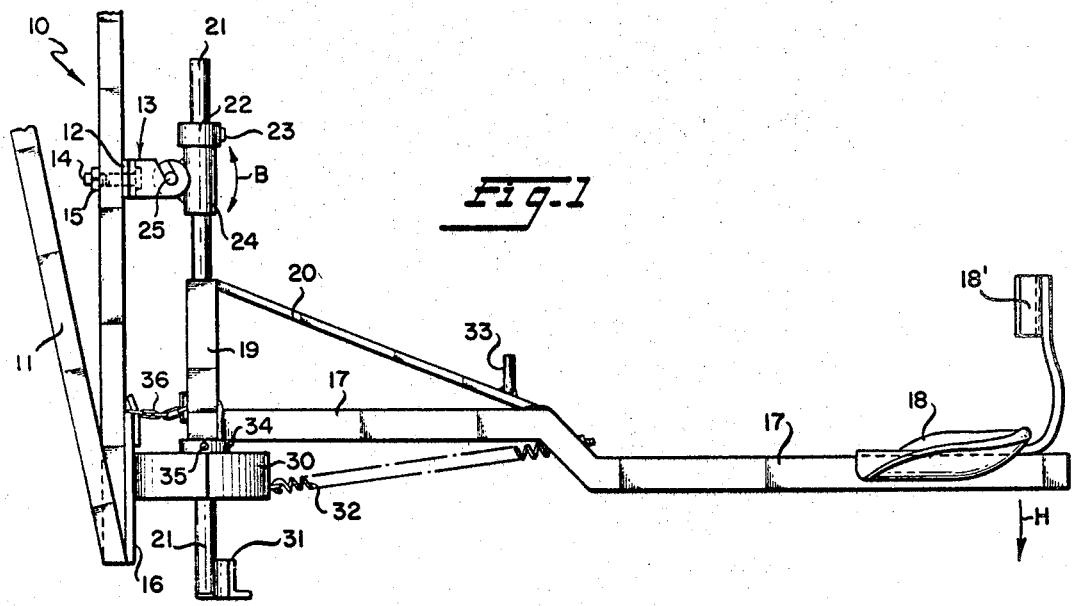
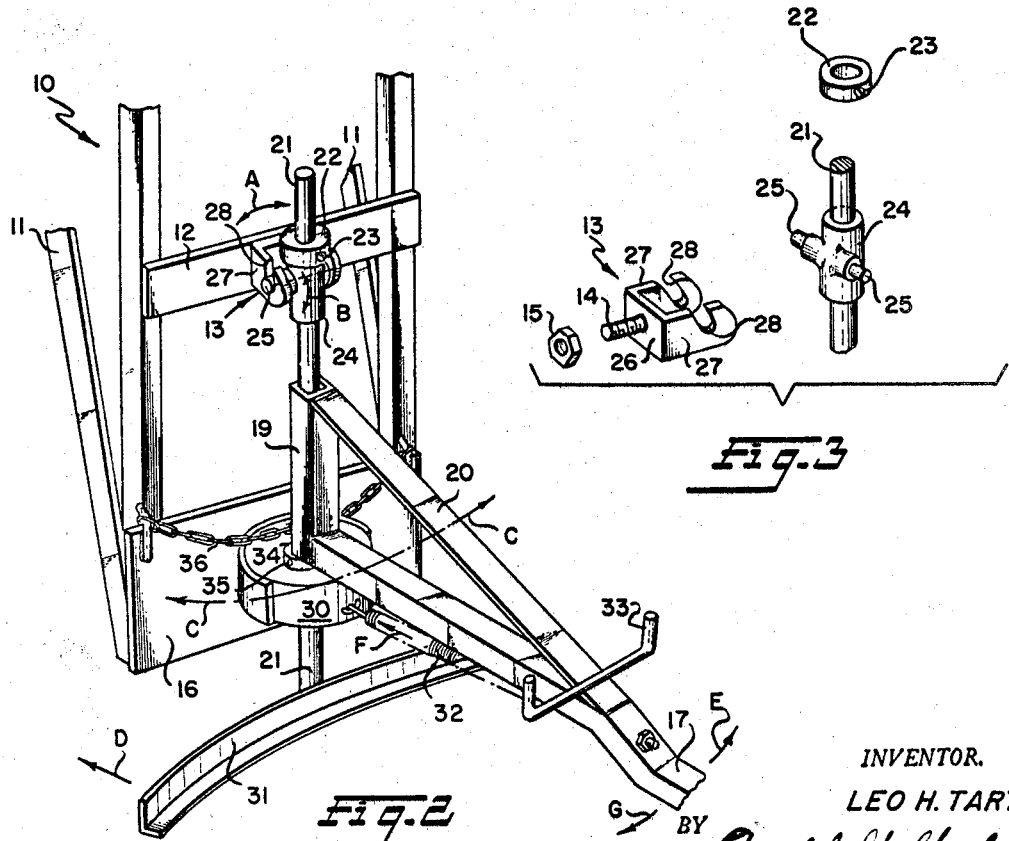
INVENTOR.
LEO H. TART
BY
Arnold G. Gulko
ATTORNEY July 16, 1968 L. H. TART 3,393,009
CONTROLLED SWINGING SEAT ARRANGEMENT FOR ROW CROP CONVEYOR
Filed March 9, 1967 2 Sheets-Sheet 2
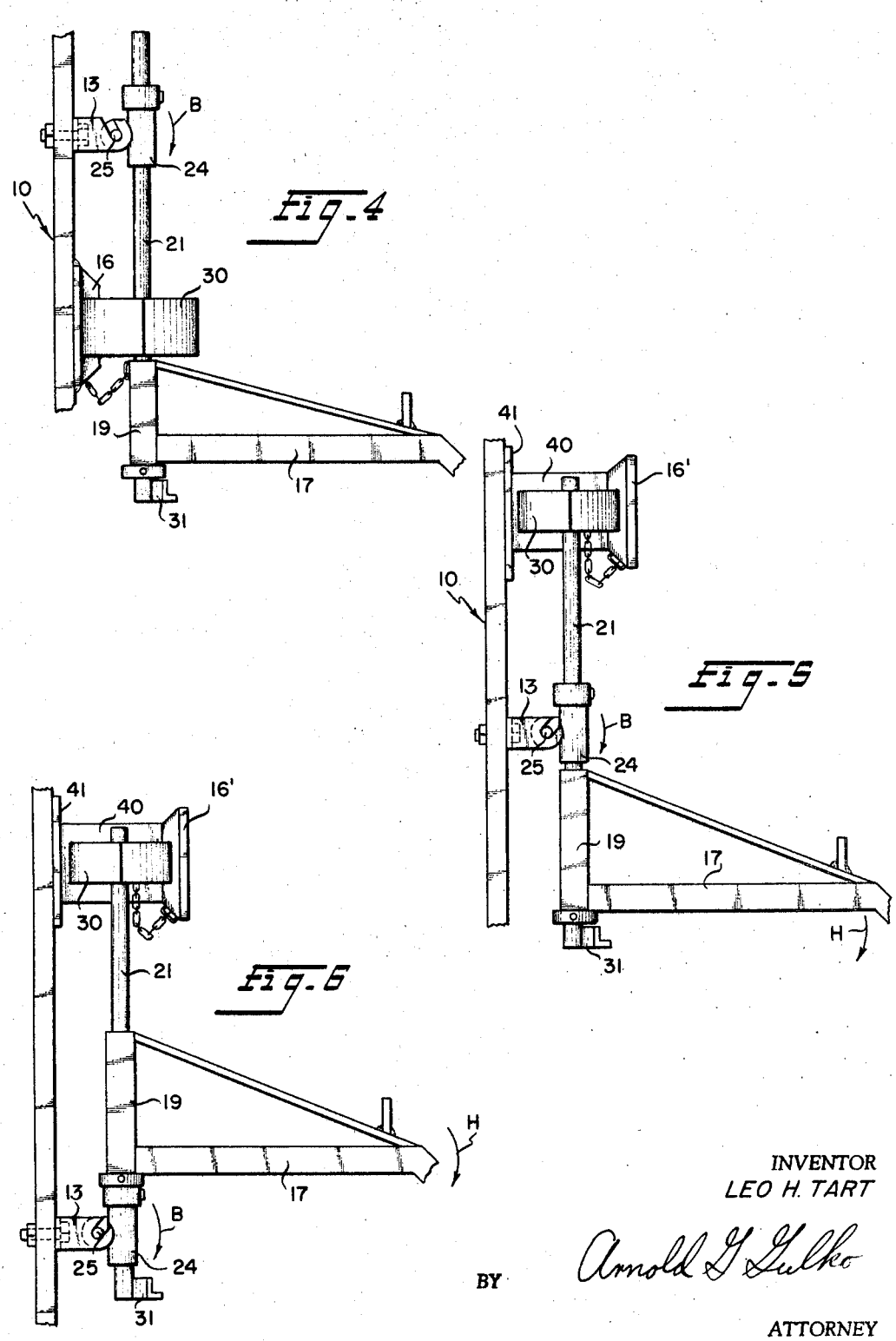
INVENTOR
LEO H. TART
BY Arnold G. Gulko
ATTORNEY United States Patent Office 3,393,009
Patented July 16, 1968

3,393,009
CONTROLLED SWINGING SEAT ARRANGEMENT
FOR ROW CROP CONVEYOR
Leo H. Tart, Rte. 1, Box 61, Newton Grove, N.C. 28366
Continuation-in-part of application Ser. No. 551,129,
May 18, 1966. This application Mar. 9, 1967, Ser.
No. 621,841
11 Claims. (Cl. 297—314)

ABSTRACT OF THE DISCLOSURE

A swinging seat is hung on the vertical support element of a crop conveyor to permit lateral swinging movement of the seat over the ground to aid a workman in positioning himself from side to side despite the slant of the terrain over which he is being conveyed. The seat is positioned on the outer end of a horizontal rail and a vertical journal box is secured to the rail at its inner end. A main shaft extends through the journal box and a securing mechanism is carried by the shaft to enable the structure to be hung on the vertical support of the crop conveyor. The shaft also carries a bearing element, and the securing means and the bearing element are positioned so that the weight of the seat at the outer end of the rail pivots the shaft about the securing means to force the bearing element against the vertical support.

The present application is a continuation-in-part of my prior application Ser. No. 551,129 filed May 18, 1966, and now abandoned.

The present invention relates to a controlled swinging seat arrangement for a row crop conveyor which enables a workman using the same to comfortably and easily position himself from side to side to facilitate his work and to do so with minimal interference from the slant of the terrain over which he is being conveyed.

The picking of crops is tedious, and to ease the burden and increase productivity, wheeled vehicles, known as row crop conveyors, are used to move the workment along the rows of produce to be picked or otherwise serviced. These crop conveyors, as is well known, carry one or more vertical support elements with which a seat is associated. The workman sits in this seat and bends over to pick the crop as it passes beneath him.

To facilitate the picking operation, seats movable from one position to another have been used so that the workman would not have to strain and reach as much. However, when the crop conveyor was tilted because of the grade underlying the conveyor, the seat would move or swing downhill, and the workman would have to exert significant effort to remain in place and he would frequently have to work with his seat in a non-horizontal position.

The invention greatly eases the burden on the workman by utilizing a swinging seat which remains horizontal and approximately in place as the grade changes and which is easily swung side to side irrespective of the tilt of the conveyor.

In accordance with the present invention the conveyor seat is hung from a vertical support element of a crop conveyor for lateral swinging movement with respect thereto. The conveyor seat includes a horizontal seat support rail having a seat at its outer end and a vertical journal box at its inner end. A main shaft extends through the journal box and this shaft is pivoted to the support element by securing means carried by the shaft. A bearing element is secured to the main shaft, the weight of the seat, its support rail and the workman pivoting the bearing element against a vertical bearing platform forming part of the vertical support element. In this way, the bearing element can shift laterally along the vertical bearing platform under the force of gravity so that the seat remains horizontal as the vertical support element tilts, depending upon the slant of the terrain. At the same time, the workman is free to use his feet to swing the seat to the right or left as the need arises. Preferably, the main shaft carries a laterally extending foot rest at its lower end so that the workman can lift his feet and be entirely free of the ground and so that the seat can be swung as desired by the workman by gentle pressure exerted against the foot rest on one side or the other. In the preferred structure, the shaft is pivoted to the support element above the level of the journal box and the bearing element is secured to the main shaft below the journal box, but despite permissible variation in the positioning of the securing means and the bearing element, the weight of the workman on the seat causes the shaft to be pivoted to force the bearing element against the vertical bearing platform.

The invention will be more fully understood from the accompanying drawings in which:

FIG. 1 is a side elevation showing a preferred conveyor seat constructed and mounted in accordance with the invention;

FIG. 2 is a partial perspective view which attempts to diagramize the various pivotal and swinging movements which are employed;

FIG. 3 is an exploded view showing the securement of the main shaft to the vertical support element;

FIG. 4 is a partial cross-sectional view illustrating a structure similar to that pictured in FIG. 1, but in which the journal box is positioned below the bearing element or rocker;

FIG. 5 is a view similar to FIG. 4, and illustrating a further variation in which the bearing element or rocker is positioned above the pivotal securement to the vertical support element so that the bearing element or rocker is pivoted rearwardly against a platform positioned behind it. In this structure, the securing means is carried by the main shaft above the journal box; and FIG. 6 is another view similar to that shown in FIG. 4 but showing a further variation like that pictured in FIG. 5 but in which the securing means is carried by the shaft below the journal box.

Referring more particularly to FIG. 1, the numeral 10 identifies a vertical support element only the lower end of which is shown. Since the row crop conveyors and their securement to the vertical support element 10 are well known, these are not shown in the drawings. The support element 10 shown includes a brace 11, but this is of little consequence.

More importantly, the support element 10 includes a cross piece 12 to which is secured a carrying member 13 by means of a single bolt 14 and nut 15 so that the carrying member 13 is free to rotate about the bolt 14 as shown by the double-ended arrow A in FIG. 2. The support element 10 further includes a vertical bearing platform 16 which is positioned near the lower end of the support element 10. As will appear more fully hereinafter, the cross piece 12 is mounted above the platform 16.

The conveyor seat includes a seat support rail 17 having a seat 18 secured to its outer end. The seat 18 may include a back rest 18', but this is not essential.

The seat support rail 17 extends horizontally and it is secured at its inner end to a vertical journal box 19 which preferably takes the form of a tubular element which extends upwardly from the inner end of the rail 17. To strengthen the joint between the rail 17 and the journal box 19 a brace 20 is used as shown, the brace 20 being welded to secure its inner end to the upper extremity of the journal box 19 and its outer end to a mid-point along the length of the rail 17.

Extending through the journal box 19 is a main shaft 21. At the upper end of shaft 21 above the journal box is securing means for pivotally connecting the shaft to the carrying member 13 on cross bar 12 of the vertical support element 10. The securing means includes a collar 22 which is fastened to the main shaft 21 at any desired position by means of the set screw 23.

Slidably mounted on the shaft 21 and positioned between the journal box 19 and the collar 22 is a tubular securing element 24 which is formed to include outwardly extending arms 25 which are adapted to engage the carrying member 13. The detailed construction of the carrying member 13 and the securing element 24 will be seen with greater clarity in the exploded view of FIG. 3.

Referring more particularly to FIG. 3, the carrying member 13 includes an apertured rear face 26, through which the bolt 14 extends, and side members 27, forming a yoke. The side members 27 are formed with grooves 28 in which the arms 25 of the securing element 24 are hung.

Referring to FIG. 1, it will be observed that the freely mounted securing element 24 assumes whatever position along the length of the shaft 21 is dictated by the collar 22. In this way, the height of the seat 18 above the ground can be adjusted. At the same time, and in the preferred construction shown, the entire conveyor seat can be lifted away from the vertical support element for separate storage.

Below the journal box 19, a bearing element 30 is fixedly secured to the shaft 21. This bearing element 30 preferably takes the form of a rocker or wheel and the forward surface thereof which contacts the vertical bearing platform 16 is desirably surfaced with a frictional material. The rocker 30 is formed to include a collar 34 and set screw 35 secures the rocker to the main shaft 21.

At the lower end of the shaft 21 is welded a foot rest 31 which extends laterally on both sides of the seat 18. As will be evident in FIG. 1, the workman would sit on the seat 18 with his legs straddling the rail 17 and his feet on the rest 31.

Certain ancillary structure can also be used. For example, spring element 32 can be used to interconnect the rear of the rocker 30 with an intermediate portion of the rail 17. The tension supplied by spring 32 serves to center the seat 18 in the absence of foot pressure. In this way, the main shaft and the rocker are returned to position when upset and the main shaft and rocker are held in position while the complete seat assembly is removed and returned.

The operation of the conveyor seat will be understood with particular clarity from a review of the various pivotal and swinging movement which take place, these being identified by arrows in FIGS. 1 and 2. First, and referring to FIG. 2, the securement of the carrying member 13 to the cross piece 12 by means of the bolt 14 has already been mentioned, this mounting permitting the carrying member 13 to swivel around the bolt 14 as indicated by the double-ended arrow A. At the same time, the mounting of securement element 24 by means of its arms 25 which are hung in the grooves 28 of the carrying member 13 permits the main shaft 21 to pivot as indicated by the double-ended arrow B. The combination of pivotal movements A and B provides what is, in essence, a universal joint.

Referring to FIG. 1, it will be seen that the weight of the rail 17 and the seat 18 and especially when a workman is seated in the seat, provides a force indicated by the arrow H. This force H tends to pivot the entire structure, including the main shaft 21 about the arms 25 as indicated by arrow B and this serves to jam the bearing element 30 against the vertical platform 16 and this contact is maintained irrespective of whether the conveyor is moved uphill or downhill.

It will also be observed that the bulk of the weight of the conveyor seat is below the pivot provided by arms 25 to provide a pendulum effect in which the swivel movement indicated by arrow A permits the force of gravity to maintain the shaft 21 in a vertical position, the bearing element 30 moving laterally across the face of the vertical bearing platform 16 as indicated by the double-ended arrow C.

Lastly, the foot rest 31, desirably curved and formed of angle iron as shown, enables the workman seated in the seat 18 to ride free of the ground and to easily and controllably swing the rail 17 with the seat 18 carried thereby as diagramized in FIG. 2. Thus, foot pressure as indicated by arrow D on the foot rest 31 causes the seat 18 to be swung in an opposite direction as indicated by arrow E. Foot pressure with the other foot, indicated by arrow F, again provides an opposite reaction identified by arrow G. Interestingly, the foot pressure noted serves to move the element 30 laterally to thereby tilt the main shaft 21 so that the weight of the workman serves to assist the desired swinging movement of the seat 18.

It should also be appreciated that foot pressure applied to the foot rest 31 transmits force through the main shaft 21 to the rocker 30 which causes the rocker 30 to move laterally along the platform 16, thus tilting the main shaft 21 a few degrees to one side or the other away from the vertical. This is of use when the crop conveyor is moving laterally along slanted terrain as many crops normally run. If the main shaft 21 were to remain perpendicular to the conveyor, the workman would swing downhill. However, and utilizing foot pressure as just explained, the workman can lift the seat at the outer end so that the seat assembly will remain truly perpendicular whereby a well balanced position is maintained even though the terrain is slanted. As will be evident, when the workman does not have to fight the tendency of the seat to drift away from where he wishes it, he will find his tasks less tiring, leading to high performance with a minimum of effort.

The foregoing is illustrated by a workman being carried over slanted terrain having its high side on the workman's left such that, and in the absence of foot pressure, the bearing element remains forced against the vertical support so that the shaft tilts to remain perpendicular to the ground and his seat tends to swing downhill to the right. However, when the workman pushes his right foot forward, he causes the lower end of the shaft to move to the right so that the shaft returns to a true perpendicular position even though the vertical support is slanted to follow the slant of the terrain. Since there is no tendency for the seat to swing when the main shaft is vertical, the workman has overcome the tendency of the slant of the terrain to move him to the side when he does not wish to move. Thus, foot pressure is used to maintain the support shaft vertical and enables the seat to be positioned by the workmen without regard to the slant of the terrain.

Many different tray and basket arrangements can be provided, as will be evident. To illustrate this, reference is made to yoke-shaped rod 33 which is welded to brace 20 to support a basket.

It is also desirable to employ safety chains 36 to keep the seat under control in the event that the crop conveyor undergoes some violent maneuver.

With particular reference to the preferred form of conveyor seat shown, a workman using the seat can cover a width of up to about six feet over vine crops, and two rows can be covered simultaneously when dealing with taller crops. It is adaptable to all types of manual harvesting of crops and is of particular advantage in harvesting vine-grown crops. Some of the crops that can be harvested on the conveyor seat are strawberries, market or pickle cucumbers, peppers, squash, beans, peas, greens, beets, carrots, collards, cabbage, onions, radishes and tomatoes. Both sweet and Irish potatoes can also be picked up and basketed by workers sitting on the conveyor seat. Special hand work can be done to crops, such as hand weeding when crops are small, early suckering of tobacco and also cropping tobacco.

The conveyor seat shown is adjustable. Height adjustment is easily effected using the collar 22, but other adjustments are easily made, e.g., the position of the rocker 30 on the shaft 21 can be changed utilizing the set screw 35 and the carrying member 13 can be secured to a differently positioned cross piece 12. Also, the position of the seat can be adjusted forward or backward along the length of rail 17 to adjust the distance between the seat and the foot rest 31.

The device of the invention is of outstanding advantage when working on hillsides and non-level ground. Here conventional swinging seats attempt to shift the workman away from his work and considerable energy is required to stay in position at all times and the workman frequently finds that he is in an awkward position which cramps and strains his muscles. In the invention, the workman can shift his position uphill as easily as downhill, he remains horizontal at all times and wild swinging movements are largely eliminated.

As previously indicated, there is considerable latitude permitted in the positioning of the securing means and of the bearing element with respect to the journal box so long as the seat and the weight of the workman on the seat causes the main shaft to pivot to force the bearing element against the vertical bearing platform which forms part of the vertical support element. These variations are illustrated in FIGS. 4, 5 and 6.

Referring more particularly to FIG. 4, it will be seen that the structure pictured is exactly the same as that shown in FIG. 1 with the exception that the bearing element 30 is positioned above the journal box 19. Once again, the weight of the rail 17, the seat 18, and a workman seated in the seat, provide a force indicated by the arrow H which tends to pivot the entire structure, including the main shaft 21, about the arms 25 as indicated by the arrow B to jam the bearing element 30 against the vertical platform 16.

Referring to FIG. 5, the vertical platform 16 is carried above both the journal box 19 and the securing means 24 but, again, the pivoting force H is the same to cause a pivotal movement B about the arms 25. Since the bearing element 30 is now positioned at the top of the main shaft 21, it is moved rearwardly against a vertical platform 16' which is carried by means of arms 40 which are connected to a horizontal rail 41 secured at the upper end of the vertical support element 10.

Lastly, FIG. 6 pictures a less preferred embodiment, but one which is nonetheless operable, in which the securing means 24 is positioned below the journal box 19. Once again, the force H causes pivotal movement indicated by arrow B to force bearing element 30 which is secured at the upper end of the main shaft 21 to move rearwardly against the vertical bearing platform 16' which is carried by arms 40 secured to horizontal rail 41.

It will be understood that many mechanical variations will be immediately apparent to those skilled in the art and it will be further understood that the invention is not to be construed by any abstract of disclosure, but its features are instead characterized in the description given hereinbefore and it is defined in the claims which follow.

I claim:

1. A conveyor seat adapted to be hung from a vertical support element of a crop conveyor for lateral swinging movement with respect thereto comprising a horizontal seat support rail having a seat at its outer end, a vertical journal box secured to said seat support rail at the inner end thereof, a main shaft extending through said journal box, securing means carried by said shaft and adapted to be pivotally connected to said vertical support element, and a bearing element secured to said main shaft, said securing means and said bearing element being positioned so that the weight of said seat at the outer end of said rail will pivot said shaft about said securing means and force said bearing element against said vertical support.

2. A conveyor seat as recited in claim 1 in which a foot rest is secured to the lower end of said main shaft and extends laterally thereof on both sides of the shaft.

3. A conveyor seat as recited in claim 1 in which said securing means comprises a collar adjustably secured to said main shaft and a tubular securing element freely mounted on said shaft below said collar.

4. A conveyor seat as recited in claim 3 in which said tubular securing element includes outwardly extending arms adapted to be pivotally hung in a yoke secured to said vertical support element.

5. A conveyor seat as recited in claim 1 in which said bearing element is a rocker secured to said main shaft and having a friction element at its support element-contacting portion.

6. A conveyor seat as recited in claim 1 in which said journal box extends upwardly from said seat support rail.

7. In combination a crop conveyor including at least one vertical support element, said vertical support element including a carrying member secured thereto and a vertical bearing platform, said carrying member being pivotable in the plane of said platform, said carrying member having hung thereon a conveyor seat as recited in claim 1.

8. A combination as recited in claim 7 in which said carrying member is a yoke-shaped element adapted to support an element having outwardly extending arms for pivotal movement in a vertical plane perpendicular to the plane of said platform.

9. A conveyor seat adapted to be hung from a vertical support element of a crop conveyor for lateral swinging movement with respect thereto comprising a horizontal seat support rail having a seat at its outer end, a vertical journal box secured to said seat support rail at the inner end thereof, a main shaft extending through said journal box, securing means carried by said shaft above said journal box adapted to be pivotally connected to said vertical support element, and a bearing element secured to said main shaft below said journal box.

10. A conveyor seat as recited in claim 9 in which the rear of said bearing element is resiliently connected to said seat support rail.

11. In combination a crop conveyor including at least one vertical support element, said vertical support element including a carrying member secured thereto above the lower end thereof and a vertical bearing platform near the lower end thereof, said carrying member being pivotable in the place of said platform, said carrying member having hung thereon a conveyor seat as recited in claim 9.

References Cited

UNITED STATES PATENTS

| | | | |
|---|---|---|---|
| 587,175 | 7/1897 | Black | 297—314 |
| 715,147 | 12/1902 | Redington | 248—124 |
| 1,094,293 | 4/1914 | Banks | 297—277 |
| 2,433,859 | 1/1948 | McCormick | 297—277 |
| 2,511,940 | 6/1950 | Platt et al. | 280—32.5 |
| 2,984,290 | 5/1961 | Miller | 297—314 |
| 3,199,687 | 8/1965 | Mish | 280—32.5 |

FRANCIS K. ZUGEL, *Primary Examiner.*